Nov. 9, 1971    R. J. KUHNS    3,618,495
MULTIPLE IMAGE CAMERA
Filed June 5, 1969
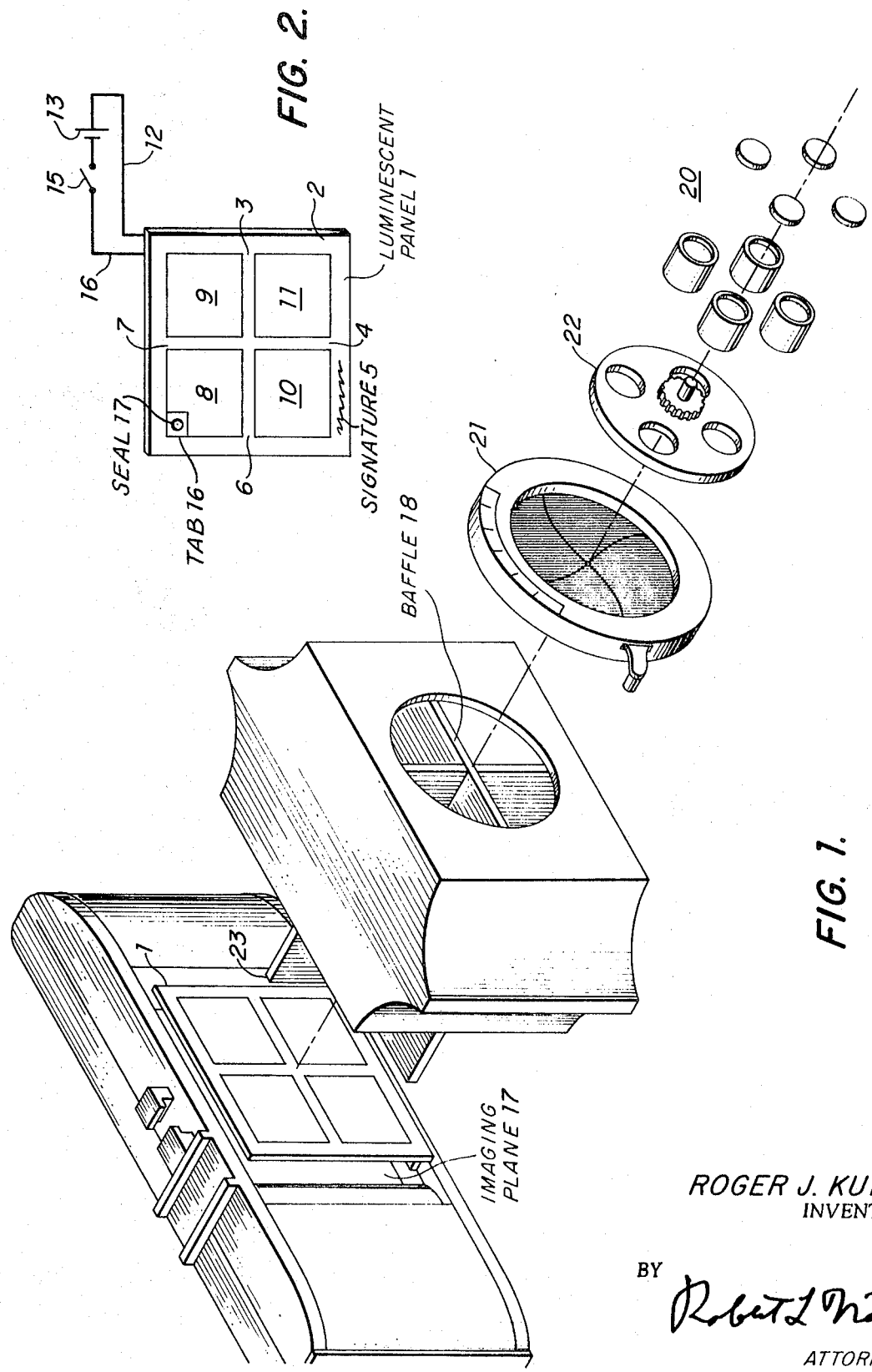
ROGER J. KUHNS
INVENTOR.
BY
*Robert L. Walker*
ATTORNEY.

United States Patent Office 3,618,495
Patented Nov. 9, 1971

3,618,495
MULTIPLE IMAGE CAMERA
Roger J. Kuhns, Lincoln, Mass., assignor to Avant Incorporated, Lincoln, Mass.
Filed June 5, 1969, Ser. No. 830,775
Int. Cl. G03b 17/24, 35/08
U.S. Cl. 95—18      1 Claim

ABSTRACT OF THE DISCLOSURE

This disclosure is directed toward a multiple image camera for simultaneously producing four photographs of a subject positioned in front of the camera upon a standard film format and includes a novel luminescent panel positioned adjacent the focal plane of the camera for producing white borders surrounding each of the four images photographed upon the film at the focal plane.

BACKGROUND OF THE INVENTION

This invention relates to the field of multiple image cameras. One type of multiple image camera is disclosed in U.S. Pat. 3,128,685, issued to S. Kitrosser, and assigned to the same assignee as the present invention, and said patent is incorporated by reference herein. As illustrated in the patent, four lenses project four images of the subject through a shutter and a baffle structure which are also illustrated in this application. The virtually identical images are focused by the lenses upon the imaging plane having a sheet of film positioned thereon. This film is preferably reversal type diffusion transfer process film such as film manufactured by Polaroid Corporation of Cambridge, Mass.

The camera disclosed in the aforesaid patent will usually produce four juxtaposed positive prints of the subject seated in front of the camera without borders between the multiple prints. For certain applications it is desirable to produce four prints upon a standard film format, each of which has a white surrounding border. These borders might be desired because they are esthetically pleasing. Certain passport laws, particularly of foreign countries, require signatures or other indicia impressed upon each multiple print in a white border area so that each print looks like a standard photograph. Accordingly, some modification is required of the prior art cameras to produce the white borders, which borders would not be produced by merely blocking off border areas from light since the desired film produces a black area wherever blocking occurs rather than a white area as with conventional film. It is possible to obtain light borders of sorts by separating the rearward edges of the baffles disclosed in the aforesaid patent some distance from the imaging plane to produce an overlap between the four images since light reaches these areas due to this separation. However, these border areas are not well defined upon development, and the ambient light in front of the lenses generally would not produce bright nor uniformly illuminated, nor controllable border images. Accordingly, it is desirable to produce well defined white borders surrounding each multiple print produced on a standard film format. It is additionally desirable to photograph at times certain indicia such as signatures or official emblems in white border areas surrounding each multiple print.

SUMMARY OF THE INVENTION

In accordance with one embodiment of the present invention a light emitting panel specially configured to produce the aforesaid white borders is positioned adjacent the focal plane of a multiple image camera. The panel produces light which strikes the film format in the desired border areas thereby to produce white, well defined borders of the desired width. If desired, light attenuating indicia such as an official signature or a seal may be formed on the surface of the panel to form an image of the indicia photographically upon one or more light borders recorded on the film to further establish authenticity. Additionally, a light transmissive member bearing further indicia may be positioned within the imaging area and affixed to the luminescent panel.

Further objects, features and advantages of the present invention will become apparent in connection with perusal of the following description taken in conjunction with:

FIG. 1 which illustrates an exploded view of the camera components including the luminescent panel positioned adjacent the focal plane, and FIG. 2 which illustrates the panel connected to a source of electrical power.

DETAILED DESCRIPTION

Referring now to FIG. 1, lens barrels 20 focus four images of the subject at imaging plane 17 upon the actuation of shutter 21 as explained in the aforesaid patent. Since FIG. 1 is an exploded view it is obvious that components 1, 18, 20, 21 and 22 are positioned in a much closer relationship to each other than illustrated. The rear edges of the baffle sections 23 would be positioned adjacent corresponding perpendicularly oriented portions of luminescent panel 1 which in turn is positioned directly adjacent the imaging plane 17 bearing positive reversal type diffusion transfer film.

In FIG. 2, luminescent panel 1 having output conductors 12 and 16, is electrically coupled to battery 13 via switch 15. The panel consists of outer light emitting border areas 2 which surround the imaging areas 8, 9, 10 and 11 which in turn correspond to the imaging areas upon the film format which receive substantially no light from the luminescent panel since the panel is positioned closely adjacent the imaging plane. Elongated portions 3, 4, 6 and 7 are configured to form a cross as shown and will complete the requisite light pattern to produce white borders completely surrounding each multiple image. An official signature 5 may be printed upon the panel as shown and will produce a perverted image upon its adjacent white border area since the printed indicia is light absorbent. The method of impressing an inverted signature upon the panel forms no part of the present invention and is well known to those skilled in the art. Another special feature relates to transparent tab 16 bearing a similar indicia such as seal 17 which may project from the luminescent panel and be positioned within imaging area 8. For added security either a signature 5 or seal 17 can straddle the border and image areas 8, 9, 10 and 11 and thus make it more difficult to remove and replace the image or portion thereof from the validated border.

Switch 15 is closed at any convenient time to cause the panel to emit light thereby to produce the aforesaid white borders.

Luminescent panel 1 preferably consists of a fluorescent plastic sheet of panelling material which emits an even light upon the application of electrical energy and which is commercially available from Sylvania Corporation, among others. Alternatively, a geometrically even grid pattern of fluorescent tubing can be utilized, or elongated lamps positioned within a panel composed of a frosted glass or other light transmissive material may be utilized. The lamps contained therein are energized by virtually any circuit arrangement well known to those skilled in the art. The inner sides of the panel are opaque to maintain sharp border definition.

I claim the following:

1. In a multiple image camera for photographically recording a plurality of pictures of a given subject in a plurality of subareas included within an area of positive film, all of said subareas being simultaneously positioned at the focal plane of the multiple image camera, the improvement comprising:

means for positioning a shutterless light emitting panel having a plurality of elongated light emitting portions between said plurality of subareas and adjacent said focal plane for simultaneously forming light border configurations between said subareas, the lengths of elongated portions of said light emitting panel corresponding to the lengths of said light borders photographically recorded on said film and the widths of elongated portions of said light emitting panel corresponding to the widths of said light borders photographically recorded on said film and;

light attenuating indicia formed on the surface of said light emitting panel acting said focal plane for forming an image of said indicia upon at least one light border recorded on said positive film.

References Cited

UNITED STATES PATENTS

| | | | |
|---|---|---|---|
| 2,891,443 | 6/1959 | Pollock | 355—19 |
| 3,128,685 | 4/1964 | Kitrosser | 95—18 |
| 3,136,232 | 6/1964 | Shoberg | 95—1.1 |
| 3,254,582 | 6/1966 | Budde | 95—13 |

JOHN M. HORAN, Primary Examiner

U.S. Cl. X.R.

95—1.1